United States Patent [19]

Duchane et al.

[11] Patent Number: 4,613,629

[45] Date of Patent: Sep. 23, 1986

[54] METHOD OF FORMING A FOAMED THERMOPLASTIC POLYMER

[75] Inventors: David V. Duchane; David L. Cash, both of Los Alamos, N. Mex.

[73] Assignee: The United States of America as represented by the Department of Energy, Washington, D.C.

[21] Appl. No.: 673,968

[22] Filed: Nov. 21, 1984

[51] Int. Cl.⁴ .............................. C08J 9/12; C08J 9/14
[52] U.S. Cl. ........................................ 521/82; 521/56; 521/60; 521/84.1; 521/87; 521/88; 521/134
[58] Field of Search ....................... 521/56, 60, 87, 88, 521/82, 84, 134

[56] References Cited

U.S. PATENT DOCUMENTS

| | | | |
|---|---|---|---|
| 2,744,291 | 5/1956 | Stastny et al. | 521/60 |
| 2,893,163 | 7/1959 | Cleland et al. | 521/60 |
| 3,085,073 | 4/1963 | Litner et al. | 521/60 |
| 3,994,840 | 11/1976 | Kajimura et al. | 521/60 |
| 4,376,751 | 3/1983 | Duchane | 264/341 |

*Primary Examiner*—Morton Foelak
*Attorney, Agent, or Firm*—Joseph M. Hageman; Paul D. Gaetjens; Judson R. Hightower

[57] ABSTRACT

A method of forming a foamed thermoplastic polymer. A solid thermoplastic polymer is immersed in an immersant solution comprising a compatible carrier solvent and an infusant solution containing an incompatible liquid blowing agent for a time sufficient for the immersant solution to infuse into the polymer. The carrier solvent is then selectively extracted, preferably by a solvent exchange process in which the immersant solution is gradually diluted with and replaced by the infusant solution, so as to selectively leave behind the infusant solution permanently entrapped in the polymer. The polymer is then heated to volatilize the blowing agent and expand the polymer into a foamed state.

9 Claims, No Drawings

METHOD OF FORMING A FOAMED THERMOPLASTIC POLYMER

BACKGROUND OF INVENTION

The invention disclosed herein is generally related to foamed polymeric materials and methods of making such materials. This invention is the result of a contract with the Department of Energy (Contract No. W-7405-ENG-36).

It has been previously known to infuse solid thermoplastic polymers with various volatile blowing agents which when heated expand the polymer into a foamed state. However, in virtually all instances the blowing agent is a volatile liquid which is compatible with the polymer that is, it is a liquid which readily wets the polymer and which in most instances at least partially dissolves the polymer. In this regard, most common thermoplastic polymers are readily wetted by the common hydrophobic solvents, for example pentane, and as a result such solvents are typically used as blowing agents for the polymers.

A disadvantage of using common blowing agents, however, is that the blowing agent leaves the polymer by diffusion as easily as it is introduced. As a result, the foaming process is partially limited by the tendency of the blowing agent to diffuse out of the polymer. For the same reason, the infused polymer cannot be stored for long periods of time as the blowing agent migrates out of the polymer.

The present invention represents an unexpected consequence of research previously conducted by the applicant, which was directed to the formation of ultra-smooth surfaces on thermoplastic polymers. As a consequence of that research there was developed a solvent-based method of smoothing the surface of a thermoplastic polymer, which is disclosed in the applicant's U.S. Pat. No. 4,376,751, which is hereby incorporated by reference. As discussed therein, it is difficult to form ultra-smooth surfaces on thermoplastic polymers by mechanical polishing techniques because of the softness and low heat conductivity characteristic of most thermoplastic polymers. To briefly summarize the teaching of the referenced patent, it was found that the surface of a polymer can be smoothed by exposing the polymer to a solution consisting of a mixture of compatible and incompatible solvents, and gradually diluting the solution with the incompatible solvent. The solution initially operates to soften and smooth the surface of the polymer. As the composition of the solution is changed, the smoothed surface of the polymer is hardened to give a surface that is smoother than can be obtained by mechanical means.

SUMMARY OF THE INVENTION

Accordingly, it is an object and purpose of the present invention to provide an improved method of forming a foamed polymer.

It is also an object to provide a method whereby a solid thermoplastic polymer can be permanently treated such that it may be foamed at a later date by a simple, irreversible step which can be conducted a long period of time after the initial treatment of the polymer.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with the method of the present invention, a foamed polymer is formed by immersing a solid polymer in an immersant solution comprising: (1) a compatible carrier solvent; and (2) an infusant solution which includes an incompatible liquid blowing agent. The infusant solution is infused into the polymer by permeation of the carrier solvent into the polymer. The carrier solvent is then selectively extracted from the polymer, preferably by a solvent exchange process described further below, to leave the infusant solution entrapped in the polymer. The polymer is then heated to soften the polymer and at the same time cause the entrapped blowing agent to volatilize and expand the polymer into a foamed state.

The term incompatible is used herein to refer to those solvents which do not wet or tend to dissolve the particular polymer to be foamed. Water is a common incompatible solvent for most thermoplastic polymers. Conversely, the term compatible is used herein to refer to solvents which readily wet the polymer, and which tend to dissolve or at least soften the polymer, thereby enabling them to diffuse into the polymer and carry with them the infusant.

The carrier solvent is preferably selectively extracted from the polymer by a process of gradually diluting the immersant solution with the infusant solution. As the compatible solvent is replaced with infusant solution in the immersant solution surrounding the polymer, the compatible solvent in the polymer is selectively extracted from the polymer while the infusant solution and its blowing agent are effectively left behind.

The infusant solution may consist solely of an incompatible blowing agent such as water, or it may preferably comprise a solution of a blowing agent and a compound selected to improve the characteristics of the foam product by enhancing the compatibility of the blowing agent with respect to the polymer. The common water-soluble polymers, such as polyethylene glycol and hydroxy propyl cellulose, are useful for this purpose.

The present invention is particularly well suited to forming partially foamed articles; that is, polymeric articles which include a foamed region and an integral yet distinct unfoamed region. This follows from the fact that the infusion of the carrier solvent and the accompanying infusant solution ordinarily occurs by diffusion into the polymer along a distinct diffusion boundary which progressively penetrates into the polymer and which can be arrested at any time, with the result being that there is a distinct boundary between the infused and noninfused regions of the polymer. This results in there being formed a foamed region which is integrally connected with the unfoamed region, yet which is separated therefrom by a well-defined boundary plane.

These an other aspects of the present invention will be more apparent upon consideration of the following detailed description of the method of the invention.

DETAILED DESCRIPTION OF THE INVENTION

The present invention is of general applicability to the solid thermoplastic polymers, for example the acrylic polymers such as poly (methyl methacrylate), polystyrene, polycarbonates, acrylonitrile-butadiene-styrene (ABS), and others.

Carrier solvents which may be used in the practice of the invention include those solvents which soften or dissolve the polymer, which are typically the common volatile organic solvents. The carrier solvent must also be one which is mutually soluble with the infusant solution Since the infusant solution is commonly water-based, as discussed below, the carrier solvent will typically be acetone or one of the other water-soluble ketones or other organic solvents.

At the outset the immersant solution must be sufficiently concentrated in the carrier solvent to result in limited softening of the polymer and penetration of both the carrier solvent and infusant solvent into the polymer, yet must not be so concentrated as to result in actual dissolution or physical deformation of the polymer article during the course of the infusion process.

The cell size of the resultant foam can be controlled to some extent by the use of a modifying agent such as polyethylene glycol or polypropylene glycol. Such agents also improve the compatibility of certain blowing agents, notably water, with respect to the polymer, thereby resulting in more uniform distribution of the blowing agent in the polymer.

EXAMPLE 1

In a demonstration of the method of the invention, a 0.25 inch diameter rod of methyl methacrylate having a density of 1.2 g/cc was immersed in 130 ml of an immersant solution consisting of 75% (by volume) acetone and 25% water. The solution was diluted with water at a rate of approximately one-half milliliter per minute over a period of approximately 20 hours. Upon removal from the solution a portion of the rod was sectioned and examined microscopically, from which it was determined that the depth of infusion was 0.011 inch. The rod was heated at 105°–110° C. for 5–10 minutes to result in a foamed region 0.023 inches thick and having a density of 0.60 g/cc.

EXAMPLE 2

In another demonstration a rod of methyl methacrylate as above was immersed in an immersant solution initially consisting of 75% acetone and 25% of an infusant solution consisting of a 1:1 mixture of water and polyethylene glycol (molecular weight 4,000). The immersant solution was gradually diluted with the 1:1 water/polyethylene glycol infusant solution over a period of approximately 20 hours. The depth of infusion was determined to be 0.037 inch. Upon heating, the infused layer expanded to a depth of 0.140 inch, with a foam density of 0.21 g/cc. A piece of the same infused rod was heated a week later to give a foam thickness of 0.053 inch and a foam density of 0.78 g/cc.

EXAMPLE 3

A methyl methacrylate rod as above was immersed in a bath consisting of 75% acetone and 25% of an infusant solution consisting of a 9:1 mixture of hydroxypropylcellulose and water. The bath was diluted with the 9:1 hydroxypropylcellulose/water infusant solution over approximately 20 hours. The depth of infusion was approximately 0.018 inch. Upon heating the infused layer expanded to a foam layer having a depth of 0.027 inch and a density of 0.77 g/cc. This foam was characterized by a very small cell size.

EXAMPLE 4

In another demonstration, a 0.25 inch rod of unmodified polystyrene having a density of 1.07 g/cc was immersed in an immersant solution consisting of a solution of 45% methylene chloride and 55% of an infusant solution consisting of a 9:1 mixture of isopropyl alcohol and propylene glycol. The bath was gradually diluted with the 9:1 isopropyl alcohol/propylene glycol solution over a period of 20 hours. The infusion depth was determined to be 0.06 inches. Upon heating as in the above example the infused layer expanded to a foamed depth of 0.18 inch and a density of 0.22 g/cc.

EXAMPLE 5

A 0.25 inch rod of unmodified polystyrene was immersed in an immersant solution consisting of 55% methylene chloride and 45% of an infusant solution consisting of a 9:1 mixture of isopropyl alcohol and polypropylene glycol 1200 (polypropylene glycol having an average molecular weight of 1200). Reaction conditions were as given above in the previous examples. After 20 hours the solution penetrated to a depth of 0.06 inch. Upon heating the infused layer expanded to give a foam layer 0.08 inch thick and having a density of 0.79 g/cc.

EXAMPLE 6

A polystyrene rod as above was immersed in an immersant solution initially consisting of 45% methylene chloride and 55% of an infusant solution consisting of a 9:1 solution of isopropyl alcohol and polyvinyl pyrrolidone (molecular weight approximately 10,000). The solution was diluted with the 9:1 isopropyl alcohol/polyvinyl pyrrolidone over 20 hours. The infusion depth was 0.06 inch. Upon heating the infused portion of the rod expanded to a foam having a density of 0.43 g/cc.

A primary advantage of the present invention is that the infused polymer can be stored indefinitely in a stable, dry condition, yet can be foamed when desired simply by heating the polymer. This characteristic of the infused polymer is in contrast with polymers infused with conventional blowing agents which ordinarily diffuse out of the polymer over relatively short periods of time. Infused polymers prepared according to the present invention have been successfully foamed after as long as a year from the date of initial infusion.

The present invention is also particularly useful for forming thermoplastic articles having an integral foamed layer and an unfoamed core. In this regard, in the preparation of the polymer for foaming there is ordinarily a well-defined boundary between the infused portion of the polymer and the noninfused portion of the polymer. Upon heating, the infused portion is foamed, with there being formed a well-defined boundary between the foamed and unfoamed portions of the polymer. Thus the present invention will find application in the formation of articles having a solid thermoplastic core, with there being integrally attached thereto a foamed exterior layer that is useful as thermal insulation or as a shock absorption layer. It is thus possible to manufacture common thermoplastic articles having an integral layer of thermal insulation, for example plastic tubing, household cups, bowls and other utensils.

The foregoing description of preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of making a foamed polymer comprising the steps of:
   a. immersing a solid polymer in an immersant solution consisting essentially of (1) a compatible (with said polymer) carrier solvent, and (2) an infusant solution of an anti-emulsion agent and an incompatible (with said polymer) liquid blowing agent, chosen from the group consisting of isopropyl alcohol and water, in said compatible carrier solvent; for a time sufficient for said immersant solution to infuse into said polymer;
   b. selectively extracting said carrier solvent from said polymer so as to leave behind said infusant solution with said blowing agent entrapped in said polymer; and
   c. subsequently heating said polymer to a temperature sufficiently high to volatilize said blowing agent entrapped in said polymeric material and thereby expand said polymer into a foamed state.

2. The method defined in claim 1 wherein said carrier solvent is selectively extracted from said polymer by gradually diluting said immersant solution with said infusant solution.

3. The method defined in claim 1 wherein said polymer is an acrylic polymer, said carrier solvent is acetone, and said infusant solution consists essentially of water.

4. The method defined in claim 3 wherein said infusant solution consists essentially of a solution of water and polyethylene glycol having a molecular weight of approximately 4,000.

5. The method defined in claim 3 wherein said infusant solution consists essentially of a solution of water and hydroxypropylcellulose.

6. The method defined in claim 1 wherein said polymer is unmodified polystyrene, said carrier solvent consists essentially of methylene chloride, and said infusant solution comprises isopropyl alcohol.

7. The method defined in claim 6 wherein said infusant solution consists essentially of a solution of isopropyl alcohol and propylene glycol.

8. The method defined in claim 6 wherein said infusant solution consists essentially of a solution of isopropyl alcohol and polypropylene glycol having an approximate molecular weight of 1,200.

9. The method defined in claim 6 wherein said infusant solution consists essentially of a solution of isopropyl alcohol and polyvinyl pyrrolidone having a molecular weight of approximately 10,000.

* * * * *